United States Patent
Miller et al.

(10) Patent No.: US 9,533,674 B2
(45) Date of Patent: Jan. 3, 2017

(54) BATTERY STATE OF CHARGE ENGINE SHUT-OFF THRESHOLD BASED ON PREDICTED OPERATION

(71) Applicant: Ford Global Technologies, LLC, Dearborn, MI (US)

(72) Inventors: Kenneth James Miller, Canton, MI (US); Douglas Raymond Martin, Canton, MI (US); William Paul Perkins, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 14/628,973

(22) Filed: Feb. 23, 2015

(65) Prior Publication Data
US 2016/0244044 A1 Aug. 25, 2016

(51) Int. Cl.
*B60W 10/06* (2006.01)
*B60W 10/26* (2006.01)
*B60W 20/00* (2016.01)

(52) U.S. Cl.
CPC ............ *B60W 20/106* (2013.01); *B60W 10/06* (2013.01); *B60W 10/26* (2013.01); *B60W 2510/244* (2013.01); *B60W 2520/10* (2013.01); *B60W 2710/0677* (2013.01); *B60W 2710/244* (2013.01); *Y10S 903/93* (2013.01)

(58) Field of Classification Search
CPC .... B60W 20/106; B60W 10/06; B60W 10/26; B60W 2520/10; B60W 2710/0677; B60W 2510/244; B60W 2710/244; Y10S 903/93
See application file for complete search history.

(56) References Cited

U.S. PATENT DOCUMENTS

| | | | |
|---|---|---|---|
| 5,820,172 A | 10/1998 | Brigham et al. | |
| 6,344,732 B2 | 2/2002 | Suzuki | |
| 6,362,602 B1 | 3/2002 | Kozarekar | |
| 6,687,581 B2 | 2/2004 | Deguchi et al. | |
| 7,490,000 B2 | 2/2009 | Siddiqui et al. | |
| 8,140,204 B2 * | 3/2012 | Okubo | B60W 30/188 701/22 |
| 8,190,318 B2 | 5/2012 | Li et al. | |
| 8,761,981 B2 | 6/2014 | Hussain et al. | |
| 8,829,848 B2 | 9/2014 | Kotooka et al. | |
| 2009/0259363 A1 * | 10/2009 | Li | B60K 6/445 701/36 |
| 2010/0035715 A1 * | 2/2010 | Ortmann | B60K 6/387 475/5 |
| 2010/0276993 A1 * | 11/2010 | King | B60L 11/12 307/9.1 |
| 2011/0166733 A1 | 7/2011 | Yu et al. | |
| 2012/0010767 A1 | 1/2012 | Phillips et al. | |
| 2013/0096747 A1 | 4/2013 | Hussain et al. | |
| 2013/0096775 A1 * | 4/2013 | Schmidt | B60K 26/021 701/36 |
| 2014/0149010 A1 | 5/2014 | Li | |
| 2014/0180516 A1 | 6/2014 | Ueda et al. | |
| 2014/0351107 A1 * | 11/2014 | Duncan | B60L 11/1861 705/34 |
| 2015/0165907 A1 * | 6/2015 | Limbacher | B60K 37/06 340/438 |
| 2015/0291152 A1 * | 10/2015 | Mould | B60W 20/1088 701/22 |

FOREIGN PATENT DOCUMENTS

DE 4321767 A1 * 1/1995 ............... B60K 6/46

OTHER PUBLICATIONS

T. van Keulen, B. de Jager, J. Kessels, M. Steinbuch, Energy Management in Hybrid Electric Vehicles: Benefit of Prediction, in: Proc. IFAC Symposium on Advances in Automotive Control, München, 2010, 6 pgs.

* cited by examiner

*Primary Examiner* — Rodney Butler
(74) *Attorney, Agent, or Firm* — David B. Kelley; Brooks Kushman P.C.

(57) ABSTRACT

A vehicle includes an engine; a fraction battery; and a controller or a battery control system having a controller. The controller is programed to respond to a predicted duration of charge sustaining operation for a drive cycle and a speed of the vehicle. When the predicted duration is greater than a predetermined duration and the speed is less than a speed threshold, the controller increases a state of charge threshold of the traction battery associated with triggering shut offs of the engine to reduce cycling of the engine during the drive cycle.

16 Claims, 8 Drawing Sheets

BATTERY STATE OF CHARGE ENGINE SHUT-OFF THRESHOLD BASED ON PREDICTED OPERATION

TECHNICAL FIELD

This application generally relates to energy management for hybrid vehicles.

BACKGROUND

A hybrid-electric vehicle includes a traction battery constructed of multiple battery cells in series and/or parallel. The fraction battery provides power for vehicle propulsion and accessory features. During operation, the traction battery may be charged or discharged based on the operating conditions including a battery state of charge (SOC), driver demand and regenerative braking.

SUMMARY

A vehicle includes an engine; a traction battery; and a controller. The controller is programed to respond to a predicted duration of charge sustaining operation for a drive cycle greater than a predetermined duration and a speed of the vehicle less than a speed threshold. The response of the controller is to increase a state of charge threshold of the traction battery associated with triggering shut offs of the engine to reduce cycling of the engine during the drive cycle.

A method of operating a hybrid electric vehicle includes in response to a predicted duration of charge sustaining operation for a drive cycle being greater than a predetermined duration and a speed of the vehicle being less than a speed threshold, increasing by a controller a state of charge threshold of a fraction battery associated with triggering shut offs of an engine to reduce cycling of the engine during the drive cycle.

A vehicle traction battery control system includes a controller. The controller is programed to respond to a vehicle speed being than a threshold speed and an expected duration of charge sustaining operation being greater than a predetermined duration. The response of the controller is to increase a traction battery state of charge threshold that, when exceeded while an engine is on, triggers a command to shut down the engine to reduce cycling of the engine.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
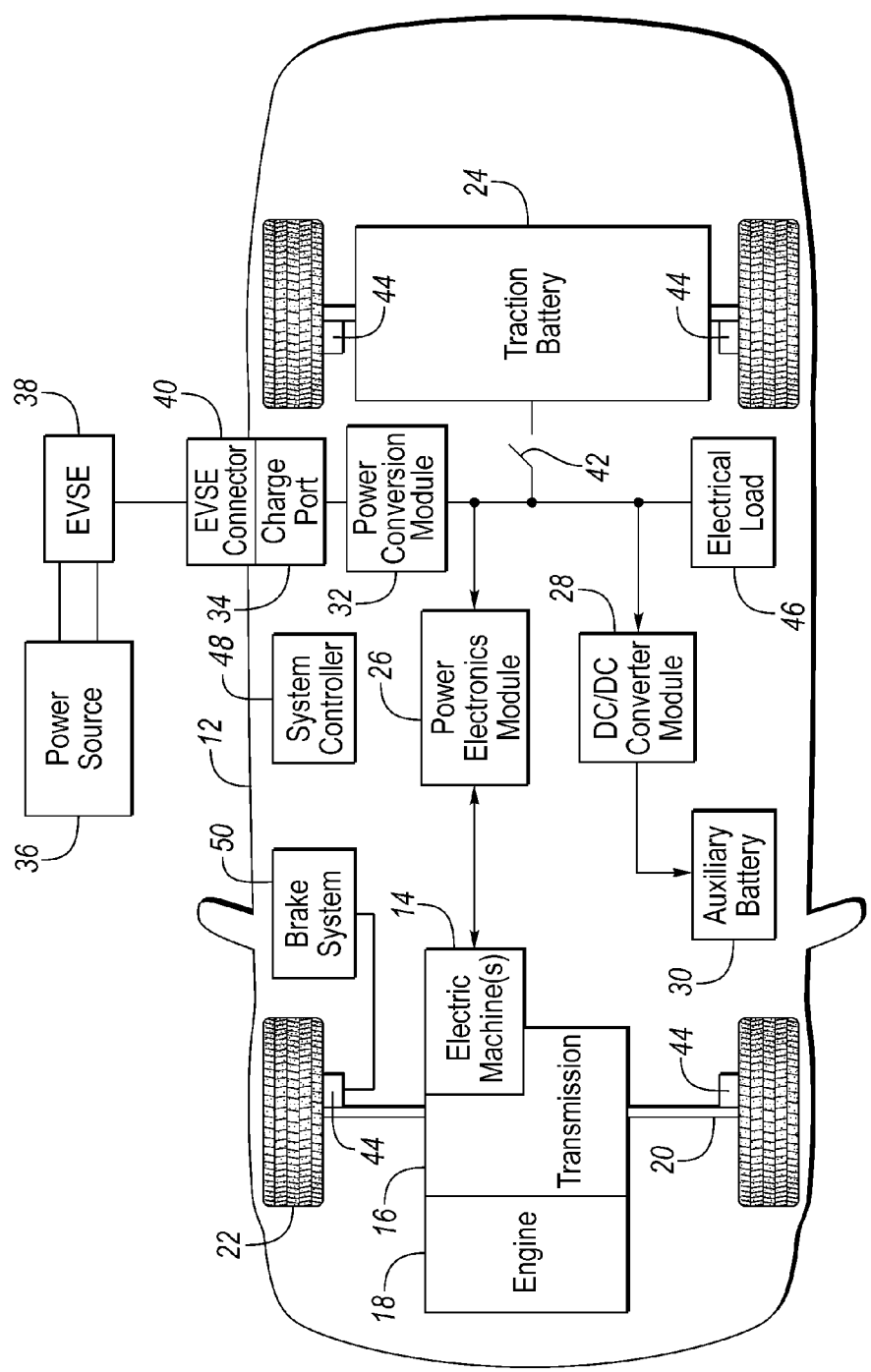
FIG. 1 is an exemplary diagram of a hybrid vehicle illustrating typical drivetrain and energy storage components.

FIG. 1 depicts a typical plug-in hybrid-electric vehicle (PHEV) having a powertrain or powerplant that includes the main components that generate power and deliver power to the road surface for propulsion. A typical plug-in hybrid-electric vehicle 12 may comprise one or more electric machines 14 mechanically connected to a hybrid transmission 16. The electric machines 14 may be capable of operating as a motor or a generator. In addition, the hybrid transmission 16 is mechanically connected to an internal combustion engine 18 also referred to as an ICE or engine. The hybrid transmission 16 is also mechanically connected to a drive shaft 20 that is mechanically connected to the wheels 22. The electric machines 14 can provide propulsion and deceleration capability when the engine 18 is turned on or off. The electric machines 14 also act as generators and can provide fuel economy benefits by recovering energy that would normally be lost as heat in the friction braking system. The electric machines 14 may also reduce vehicle emissions by allowing the engine 18 to operate at more efficient speeds and allowing the hybrid-electric vehicle 12 to be operated in electric mode with the engine 18 off under certain conditions. A powertrain has losses that may include transmission losses, engine losses, electric conversion losses, electric machine losses, electrical component losses and road losses. These losses may be attributed to multiple aspects including fluid viscosity, electrical impedance, vehicle rolling resistance, ambient temperature, temperature of a component, and duration of operation.

A fraction battery or battery pack 24 stores energy that can be used by the electric machines 14. A vehicle battery pack 24 typically provides a high voltage DC output. The traction battery 24 is electrically connected to one or more power electronics modules 26. One or more contactors 42 may isolate the traction battery 24 from other components when opened and connect the traction battery 24 to other components when closed. The power electronics module 26 is also electrically connected to the electric machines 14 and provides the ability to bi-directionally transfer energy between the traction battery 24 and the electric machines 14. For example, a typical traction battery 24 may provide a DC voltage while the electric machines 14 may operate using a three-phase AC current. The power electronics module 26 may convert the DC voltage to a three-phase AC current for use by the electric machines 14. In a regenerative mode, the power electronics module 26 may convert the three-phase AC current from the electric machines 14 acting as generators to the DC voltage compatible with the traction battery 24. The description herein is equally applicable to a pure electric vehicle. For a pure electric vehicle, the hybrid transmission 16 may be a gear box connected to an electric machine 14 and the engine 18 may not be present.

In addition to providing energy for propulsion, the traction battery 24 may provide energy for other vehicle electrical systems. A typical system may include a DC/DC converter module 28 that converts the high voltage DC output of the traction battery 24 to a low voltage DC supply that is compatible with other vehicle loads. Other high-voltage loads 46, such as compressors and electric heaters, may be connected directly to the high-voltage without the use of a DC/DC converter module 28. The low-voltage systems may be electrically connected to an auxiliary battery 30 (e.g., 12V battery).

The vehicle 12 may be an electric vehicle or a plug-in hybrid vehicle in which the traction battery 24 may be recharged by an external power source 36. The external power source 36 may be a connection to an electrical outlet that receives utility power. The external power source 36 may be electrically connected to electric vehicle supply equipment (EVSE) 38. The EVSE 38 may provide circuitry and controls to regulate and manage the transfer of energy between the power source 36 and the vehicle 12. The external power source 36 may provide DC or AC electric power to the EVSE 38. The EVSE 38 may have a charge connector 40 for plugging into a charge port 34 of the vehicle 12. The charge port 34 may be any type of port configured to transfer power from the EVSE 38 to the vehicle 12. The charge port 34 may be electrically connected to a charger or on-board power conversion module 32. The power conversion module 32 may condition the power supplied from the EVSE 38 to provide the proper voltage and current levels to the traction battery 24. The power conversion module 32 may interface with the EVSE 38 to coordinate the delivery of power to the vehicle 12. The EVSE connector 40 may have pins that mate with corresponding recesses of the charge port 34. Alternatively, various components described as being electrically connected may transfer power using a wireless inductive coupling.

One or more wheel brakes 44 may be provided for decelerating the vehicle 12 and preventing motion of the vehicle 12. The wheel brakes 44 may be hydraulically actuated, electrically actuated, or some combination thereof. The wheel brakes 44 may be a part of a brake system 50. The brake system 50 may include other components to operate the wheel brakes 44. For simplicity, the figure depicts a single connection between the brake system 50 and one of the wheel brakes 44. A connection between the brake system 50 and the other wheel brakes 44 is implied. The brake system 50 may include a controller to monitor and coordinate the brake system 50. The brake system 50 may monitor the brake components and control the wheel brakes 44 for vehicle deceleration. The brake system 50 may respond to driver commands and may also operate autonomously to implement features such as stability control. The controller of the brake system 50 may implement a method of applying a requested brake force when requested by another controller or sub-function.

One or more electrical loads 46 or auxiliary electric loads may be connected to the high-voltage bus. The electrical loads 46 may have an associated controller that operates and controls the electrical loads 46 when appropriate. Examples of auxiliary electric loads or electrical loads 46 include a battery cooling fan, an electric air conditioning unit, a battery chiller, an electric heater, a cooling pump, a cooling fan, a window defrosting unit, an electric power steering system, an AC power inverter, and an internal combustion engine water pump.

The various components discussed may have one or more associated controllers to control and monitor the operation of the components. The controllers may communicate via a serial bus (e.g., Controller Area Network (CAN), Ethernet, Flexray) or via discrete conductors. A system controller 48 may be present to coordinate the operation of the various components.

Figure 2:
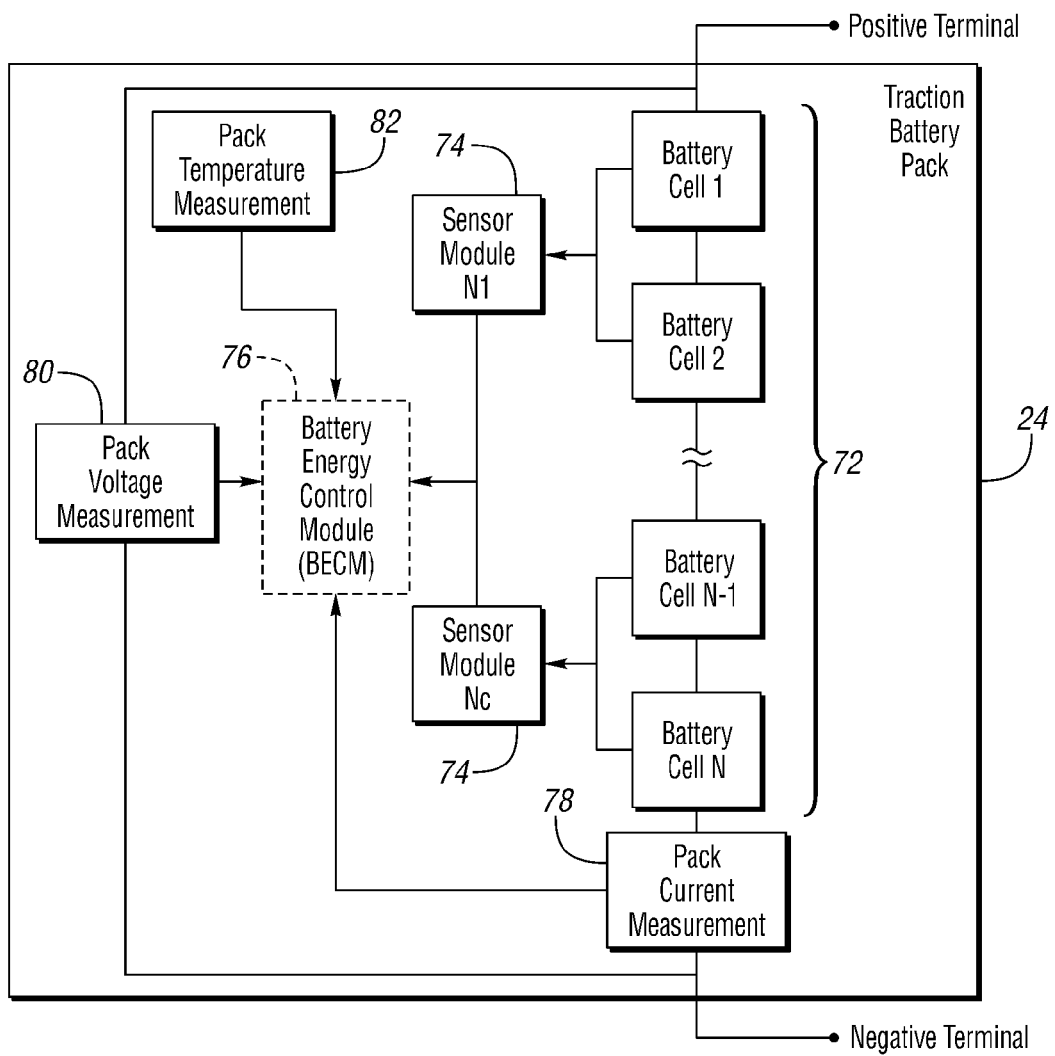
FIG. 2 is an exemplary diagram of a battery pack controlled by a Battery Energy Control Module.

A traction battery 24 may be constructed from a variety of chemical formulations. Typical battery pack chemistries may be lead acid, nickel-metal hydride (NIMH) or Lithium-Ion. FIG. 2 shows a typical traction battery pack 24 in a series configuration of N battery cells 72. Other battery packs 24, however, may be composed of any number of individual battery cells connected in series or parallel or some combination thereof. A battery management system may have a one or more controllers, such as a Battery Energy Control Module (BECM) 76 that monitors and controls the performance of the traction battery 24. The BECM 76 may include sensors and circuitry to monitor several battery pack level characteristics such as pack current 78, pack voltage 80 and pack temperature 82. The BECM 76 may have non-volatile memory such that data may be retained when the BECM 76 is in an off condition. Retained data may be available upon the next key cycle.

In addition to the pack level characteristics, there may be battery cell level characteristics that are measured and monitored. For example, the terminal voltage, current, and temperature of each cell 72 may be measured. The battery management system may use a sensor module 74 to measure the battery cell characteristics. Depending on the capabilities, the sensor module 74 may include sensors and circuitry to measure the characteristics of one or multiple of the battery cells 72. The battery management system may utilize up to $N_c$ sensor modules or Battery Monitor Integrated Circuits (BMIC) 74 to measure the characteristics of all the battery cells 72. Each sensor module 74 may transfer the measurements to the BECM 76 for further processing and coordination. The sensor module 74 may transfer signals in analog or digital form to the BECM 76. In some embodiments, the sensor module 74 functionality may be incorporated internally to the BECM 76. That is, the sensor module hardware may be integrated as part of the circuitry in the BECM 76 and the BECM 76 may handle the processing of raw signals.

The BECM 76 may include circuitry to interface with the one or more contactors 42. The positive and negative terminals of the traction battery 24 may be protected by contactors 42.

Battery pack state of charge (SOC) gives an indication of how much charge remains in the battery cells 72 or the battery pack 24. The battery pack SOC may be output to inform the driver of how much charge remains in the battery pack 24, similar to a fuel gauge. The battery pack SOC may also be used to control the operation of an electric or hybrid-electric vehicle 12. Calculation of battery pack SOC can be accomplished by a variety of methods. One possible method of calculating battery SOC is to perform an integration of the battery pack current over time. This is well-known in the art as ampere-hour integration.

Battery SOC may also be derived from a model-based estimation. The model-based estimation may utilize cell voltage measurements, the pack current measurement, and the cell and pack temperature measurements to provide the SOC estimate.

The BECM 76 may have power available at all times. The BECM 76 may include a wake-up timer so that a wake-up may be scheduled at any time. The wake-up timer may wake up the BECM 76 so that predetermined functions may be executed. The BECM 76 may include non-volatile memory so that data may be stored when the BECM 76 is powered off or loses power. The non-volatile memory may include Electrical Eraseable Programmable Read Only Memory (EEPROM) or Non-Volatile Random Access Memory (NVRAM). The non-volatile memory may include FLASH memory of a microcontroller.

When operating the vehicle, actively modifying the way battery SOC is managed can yield higher fuel economy or longer EV-mode (electric propulsion) operation, or both. The vehicle controller must conduct these modifications at both high SOC and low SOC. At low SOC, the controller can examine recent operating data and decide to increase SOC via opportunistic engine-charging (opportunistic means to do this if the engine is already running) This is done to provide longer EV-mode operation when the engine turns off. Conversely, at high SOC, the controller can examine recent operating data and other data (location, temperature, etc) to reduce SOC via EV-mode propulsion, reduced engine output, or auxiliary electrical loads. This is done to provide higher battery capacity to maximize energy capture during an anticipated regenerative braking event, such as a high-speed deceleration or hill descent.

Figure 3:
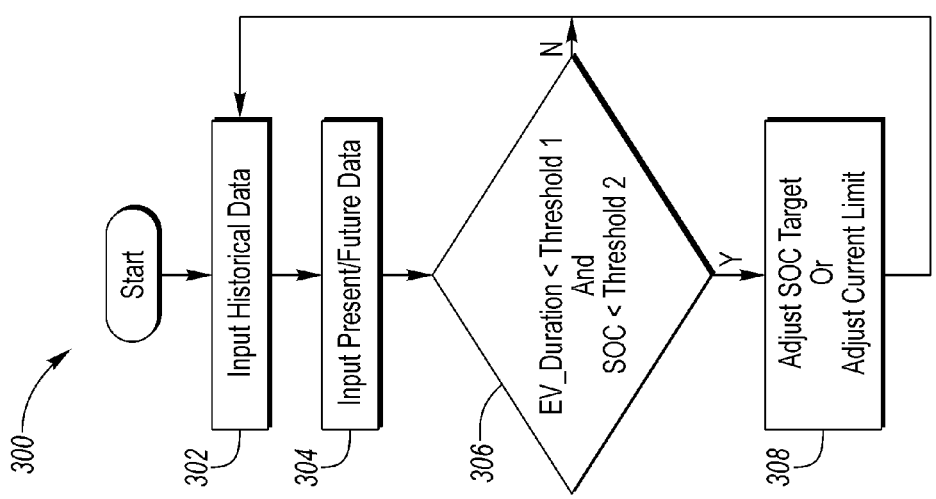
FIG. 3 is an exemplary flow diagram illustrating a target SOC computation for vehicle operation based on electric power.

FIG. 3 is an exemplary flow diagram 300 illustrating a method of modifying battery management parameters when the battery has a low SOC. The change in battery management may increase vehicle operation based on electricity alone or improve engine efficiency, or both. The figure shows a target SOC computation for vehicle operation based on electric power. Historical data is input in block 302 in which the historical data includes a recent battery SOC or a battery SOC histogram, an auxiliary electric load, a vehicle speed, recent vehicle operation based on electricity only, or driver behavior. The auxiliary electric loads include a battery cooling fan, an electric air conditioning unit, a battery chiller, an electric heater, a cooling pump, a cooling fan, a window defrosting unit, an electric power steering system, an AC power inverter, and an internal combustion engine water pump. Also, present and future data is input in block 302. The present data includes an auxiliary electric load and a vehicle speed. The future data includes estimated duration of vehicle operation based on electricity only and road grade also referred to as slope or changes in elevation. Relating to road grade is the angle of inclination which is the angle between the longitudinal plane of the vehicle and earth's horizontal plane. The angle of inclination may be determined by multiple means including an output of an inclinometer or a combination of wheel speed sensor output indicative of acceleration along a longitudinal plane of the vehicle and longitudinal accelerometer output indicative of an acceleration along the longitudinal plane as affected by gravity.

An estimated duration of vehicle operation based on electricity only is calculated in block 304. The estimated duration of vehicle operation based on electricity only calculated in 304 and the battery SOC are compared against a threshold values in block 306. If the estimated duration of vehicle operation based on electricity only is less than a first threshold and the battery SOC is less than a second threshold, a target SOC is adjusted or a current limit is adjusted in block 308.

The adjustment of the target SOC may include an increase to a target SOC such that when an internal combustion engine (ICE) is operating, the operation time may be increased or the energy output from the ICE may be increased, or both. The increase in operation time or output energy may be to support battery charging, thus allowing the battery to supply electrical energy for a longer duration when the vehicle operates on electricity only (i.e., EV mode). Also, the energy generation may be optimized based on a brake specific fuel consumption map of the ICE. This may result in greater fuel efficiency during the total vehicle trip.

Figure 4A:
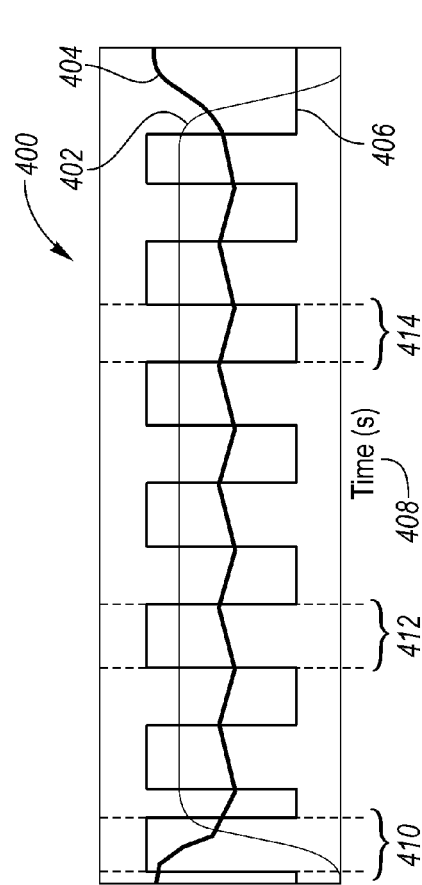
FIG. 4A is an exemplary graph that illustrates battery state of charge, vehicle speed and internal combustion engine operation in relation to time.

FIG. 4A is an exemplary graph 400 that illustrates battery state of charge 404, vehicle speed 402 and internal combustion engine operation 406 in relation to time. When the vehicle begins operation from a stopped position, the vehicle acceleration may use battery power or power from an internal combustion engine (ICE), or both. An example of vehicle acceleration is shown during the time 410. After the vehicle accelerated, it achieved a travel speed. The travel speed in this example is a vehicle speed in which the vehicle is capable of being propelled by electricity only. At this speed, typically, the battery SOC will toggle around a target battery SOC having charging time periods 412 in which the ICE is operating to charge the battery, and discharging time periods 414 in which the ICE is shut-off and the vehicle operation is by battery alone. For a consumer these short periods of EV-mode may dissatisfy the driver, as many hybrid vehicle consumers desire long periods of EV operation.

Figure 4B:
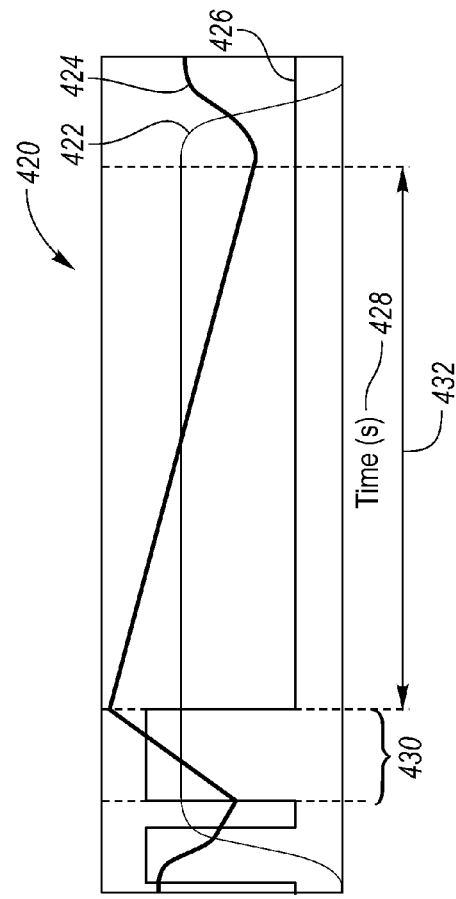
FIG. 4B is an exemplary graph that illustrates battery state of charge, vehicle speed and internal combustion engine operation in relation to time such that the internal combustion engine operation is adjusted to maximize EV duration.

FIG. 4B is an exemplary graph 420 that illustrates battery state of charge 424, vehicle speed 422 and internal combustion operation 426 in relation to time 428 in which an internal combustion engine operation 426 is adjusted to maximize EV duration. Here like in FIG. 4A, the vehicle is accelerated from a stop. But, after reaching the travel speed, being a vehicle speed in which the vehicle is capable of being propelled by electricity only, a controller increases the SOC threshold at which the engine shuts off such that the engine continues to charge the battery and increase the battery state of charge 424. The vehicle may operate the internal combustion engine (ICE) for a time 430 greater than a time 412, such that the ensuing electric vehicle only operation occurs for a time 432 greater than a time 414. Also, the vehicle may operate the engine at a speed, a torque, and a fuel consumption rate that maximizes power output with respect to the fuel consumption rate. The controller may choose an engine operating point based on data from a brake specific fuel consumption (BSFC) table, wherein the engine operates at a fuel consumption greater than a minimum fuel consumption thus increasing a current flowing from the generator to the battery. This may increase an engine operational hysteresis also referred to as just a hysteresis to alleviate the typical engine cycling also referred to as toggling on and off around a typical battery SOC operating range or set point.

Figure 5A:
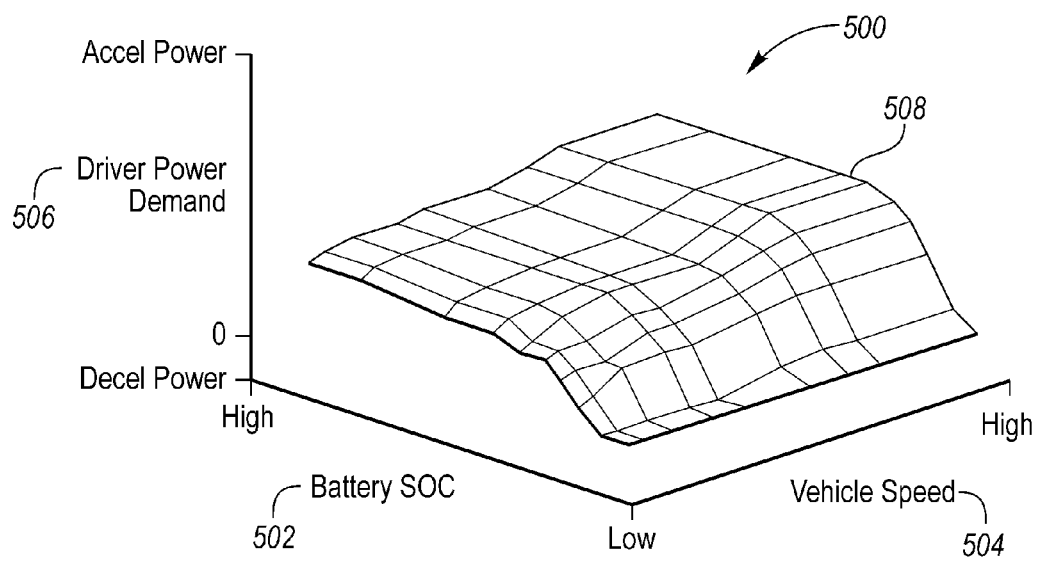
FIG. 5A is an exemplary graph that illustrates an internal combustion engine start point in relation to driver power demand, battery state of charge and vehicle speed.

FIG. 5A is an exemplary graph 500 that illustrates an internal combustion engine starting threshold 508 in relation to driver power demand 506, battery state of charge 502 and vehicle speed 504. For a given vehicle speed and battery SOC, the graph shows the amount of driver-demanded power above which an engine start will occur. For example, when the battery SOC is low and vehicle speed is low, a relatively low amount of driver-demanded power is required to start the engine. When the engine is operating, the output power can be used to drive the wheels, to generate electricity via connection to generator, or to provide output to other auxiliary components.

Figure 5B:
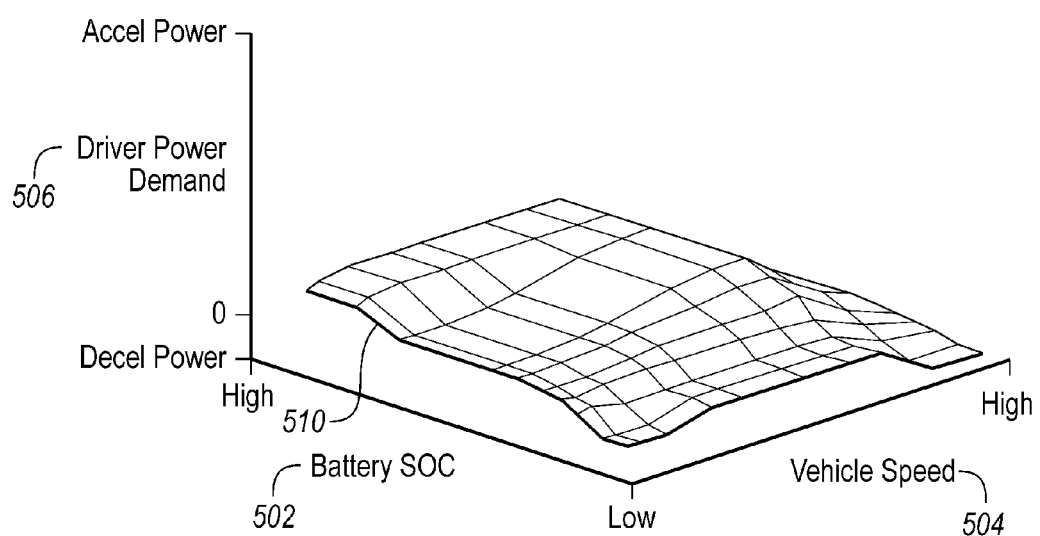
FIG. 5B is an exemplary graph that illustrates an internal combustion engine shut-off point in relation to driver power demand, battery state of charge and vehicle speed.

FIG. 5B is an exemplary graph 525 that illustrates an internal combustion engine shut-off threshold 510 in relation to driver power demand 506, battery state of charge 502 and vehicle speed 504. For a given vehicle speed and battery SOC, the graph shows the amount of driver-demanded power below which the engine is shut off. For example, when SOC is high and vehicle speed is low, a relatively high level of driver-demanded power will allow the engine to shut off. When the engine is off, the vehicle can be propelled electrically or decelerated using the friction and regenerative brake system.

Figure 5C:
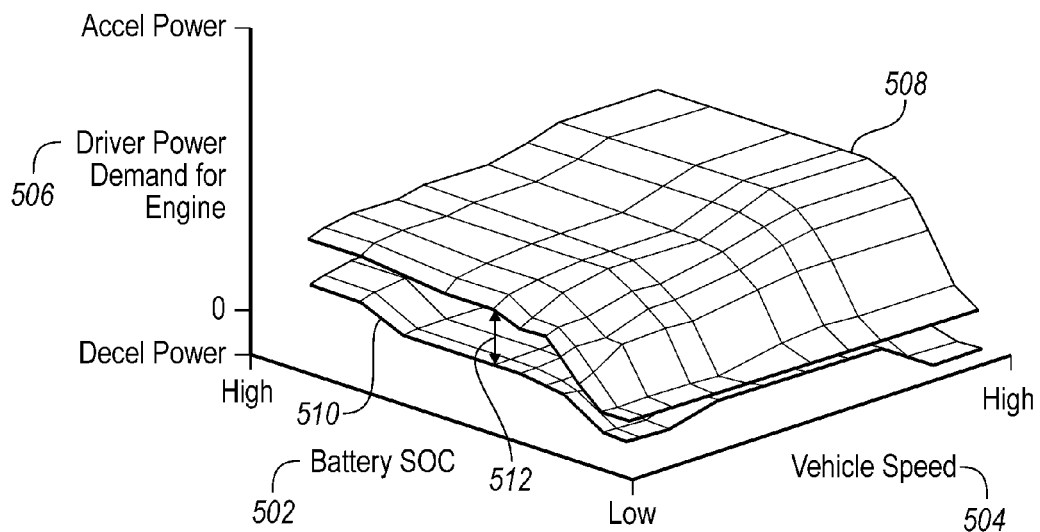
FIG. 5C is an exemplary graph that illustrates hysteresis between an internal combustion engine starting point and shut-off point in relation to driver power demand, battery state of charge and vehicle speed.

FIG. 5C is an exemplary graph 530 that illustrates hysteresis 512 between an internal combustion engine starting point 508 and shut-off point 510 in relation to driver power demand 506, battery state of charge 502 and vehicle speed 504.

Figure 5D:
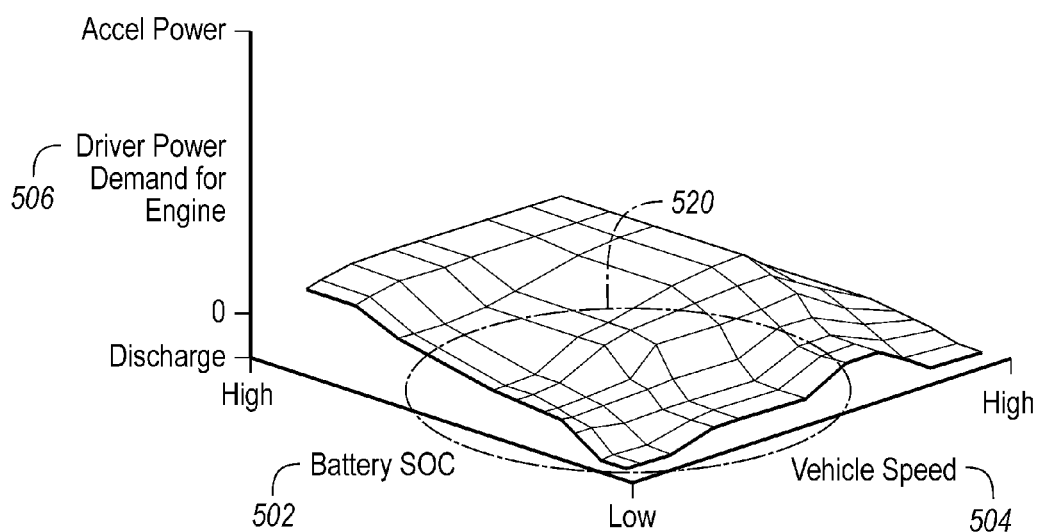
FIG. 5D is an exemplary graph that illustrates an internal combustion engine shut-off point in relation to driver power demand, battery state of charge and vehicle speed, such that an engine operational time is increased to provide a greater charge to the battery.

FIG. 5D is an exemplary graph 535 that illustrates a modified internal combustion engine shut-off threshold 520 in relation to driver power demand 506, battery state of charge 502 and vehicle speed 504, which results in longer engine operation so that the battery may be charged more before entering EV-mode.

Figure 6:
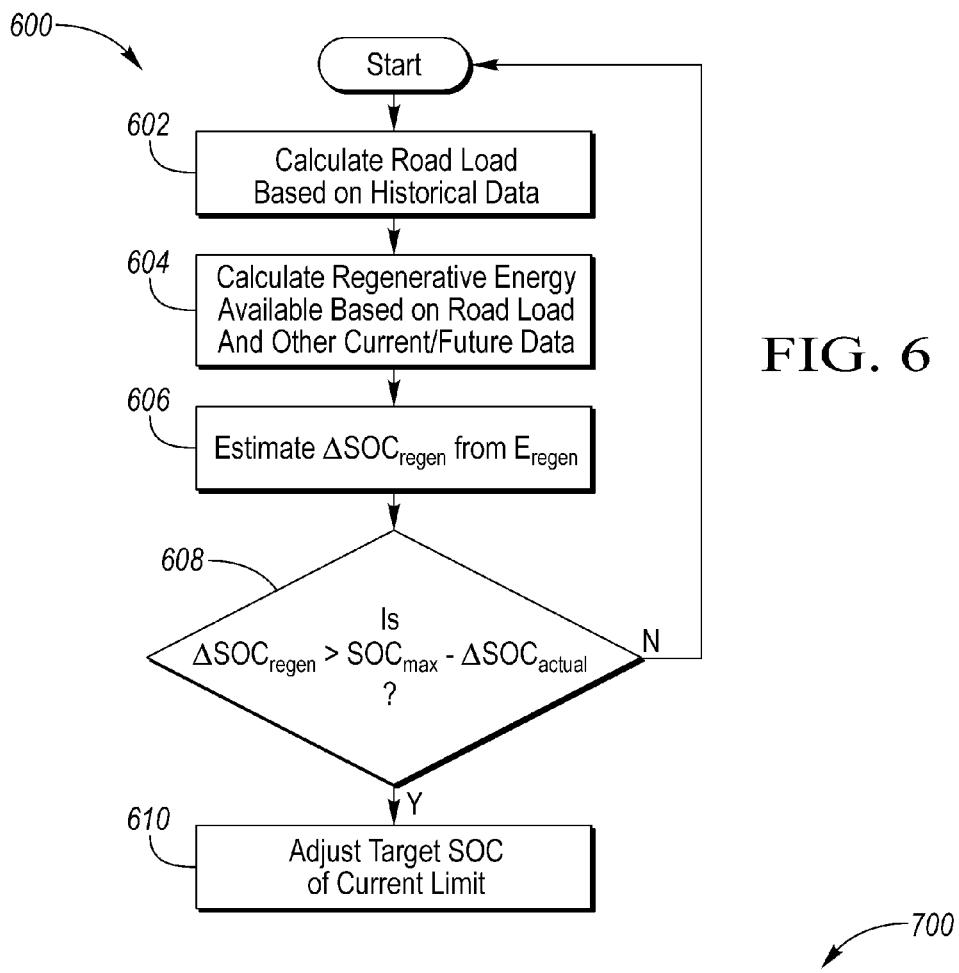
FIG. 6 is an exemplary flow diagram illustrating a target SOC computation for vehicle operation based on an available regenerative energy.

In contrast to the battery control method described in FIGS. 4-5, FIG. 6 is an exemplary flow diagram 600 illustrating a method of modifying battery management at high SOC, in relation to a vehicle speed, in order to ensure enough battery capacity to maximize energy capture during an imminent regenerative braking event. The diagram shows a target SOC computation for vehicle operation based on an available regenerative energy. In block 602 a road load is calculated based on historical data. An example calculation is shown in equation 1

$$F_{loss,parasitic} = ma - mg \sin\theta - (F_{regen} + F_{friction}) \quad (1)$$

in which, for a given point in time, m is the vehicle mass, a is the vehicle acceleration/deceleration, g is the gravitational constant, $\sin\theta$ is a road grade factor, $F_{regen}$ is the estimated force applied to vehicle deceleration from the regenerative brake system, and $F_{friction}$ is the estimated force applied to vehicle deceleration from the friction brake system. For a given set of vehicle operation data, the parasitic forces acting on the vehicle can be estimated through regressive data fitting or other means, as is known in the art. An alternative form of equation 1 is shown in equation 2

$$E_{loss,parasitic} = F_{loss,parasitic} d = E_{kinetic} - E_{grade} - (E_{regen} + E_{friction}) \quad (2)$$

in which $E_{loss,parasitic}$ is an energy loss associated with a parasitic force $F_{loss,parasitic}$ over a distance d, $F_{kinetic}$ is a kinetic energy of the vehicle over the distance, $E_{regen}$ is a potential regenerative energy capable of being captured over the distance, and $E_{friction}$ is a friction braking energy applied over the distance. The distance d in equation 2 may be evaluated over a future route or alternatively can be at a point in time. When evaluating equation 2 at a point in time, the use of current and historical data may be used. For example, $E_{kinetic}$ may be based on current vehicle speed, $E_{grade}$ may be based on current vehicle angle of inclination, while both and $E_{regen}$ and $E_{friction}$ may be based on historical data such as vehicle and ambient temperature, and a duration the vehicle is currently operating, and historical drive cycle data including road grade, vehicle kinetic energy, battery power, accessory load profiles, driver deceleration rates, and route patterns.

Also, at each point in time, a parasitic loss force, $F_{loss,parasitic}$ may be expressed as shown in equation 3

$$F_{loss,parasitic,i} = \frac{0.5mv_i^2 - (E_{regen,i} + E_{friction,i})}{d_i} - mg\sin\theta_i \quad (3)$$

in which $F_{loss,parasitic,i}$ is a road load force, m is vehicle mass, $v_i$ is a velocity of the vehicle, $d_i$ is a distance traveled over a duration, $mg \sin\theta$ is an energy applied to the vehicle due to an angle of inclination evaluated over the distance and $(E_{regen} + E_{friction})/d_i$ is regenerative energy over the distance and a friction braking energy applied over the distance. The $F_{loss,parasitic}$ changes dynamically as the vehicle is operated. Also, $F_{loss,parasitic,i}$ can be aggregated and analyzed by a vehicle controller to obtain a function describing a speed-dependent parasitic force. The function obtained may be based on multiple methods including but not limited to regression analysis, linear interpolation, curve fitting, etc.

The driveline loss changes based on temperature changes along with other factors including changes in road surface, tire pressure and steering angle. In block 604, available regenerative energy is calculated based on current and future data along with the road load force calculated in block 602. An example equation to calculate available regenerative energy for a given time period and road grade is shown in equation 4

$$E_{regen} = m\int v(dv) - mg\int v \sin\theta(dt) - F_{loss,parasitic} \int v(dt) - \int F_{friction} v(dt) \quad (4)$$

in which $E_{regen}$ is the anticipated or predicted regenerative energy, $m\int v(dv)$ is the kinetic energy based on vehicle speed and vehicle mass, $mg \int v \sin\theta(dt)$ is the force over a distance associated with the angle of inclination and the mass of the vehicle, $F_{loss,parasitic} \int v(dt)$ is the speed dependent parasitic loss or drivetrain loss over a distance based upon recent calculated road load losses or drivetrain losses, and $\int F_{friction} v$ (dt) is an anticipated energy loss based on friction braking. An estimated change in battery SOC is determined based on $E_{regen}$ from equation 2 in block 606. In block 608, the estimated change in battery SOC is compared with a maximum battery SOC minus the current battery SOC. If the estimated change in battery SOC is greater than a maximum battery SOC minus the current battery SOC, then a target SOC or current flow limit is adjusted in block 610. The adjustment of the target SOC may be a decrease of the target SOC such that current flows from the battery to reduce the battery SOC. This reduction in battery SOC makes capacity available in the battery for the anticipated regenerative braking energy. If the target SOC is not reduced, the available regenerative energy would not be captured in the battery system.

Figure 7:
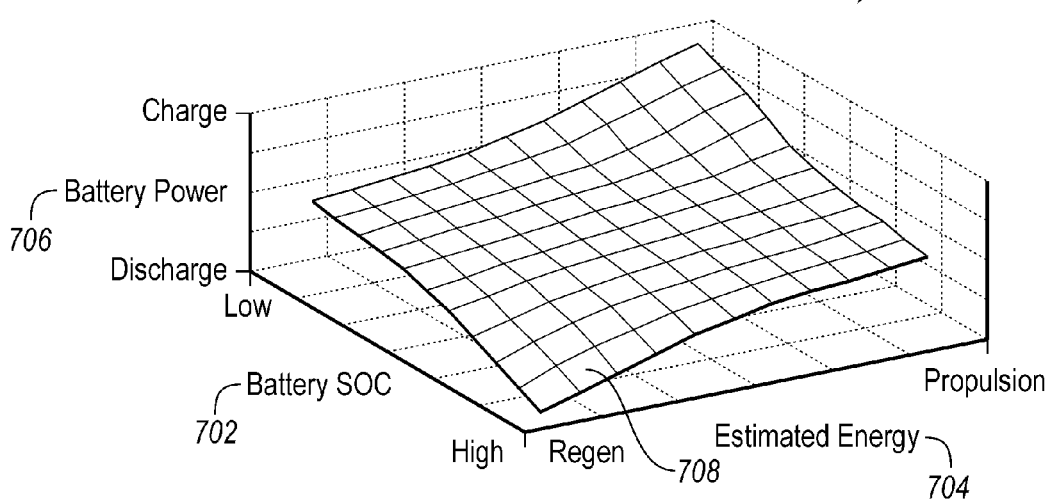
FIG. 7 is an exemplary graph that illustrates an internal combustion engine start point in relation to driver power demand, battery state of charge and an available regenerative energy.

FIG. 7 is an exemplary graph 700 showing the recommended discharge power used by the vehicle controller to decrease battery SOC based on current SOC and the anticipated energy capture during the anticipated regenerative braking event. For example, 708 shows that when battery SOC is high and the anticipated regenerative energy is also high, the vehicle controller should reduce SOC via discharge power. The discharge can be performed using EV propulsion or auxiliary electrical loads.

Figure 8:
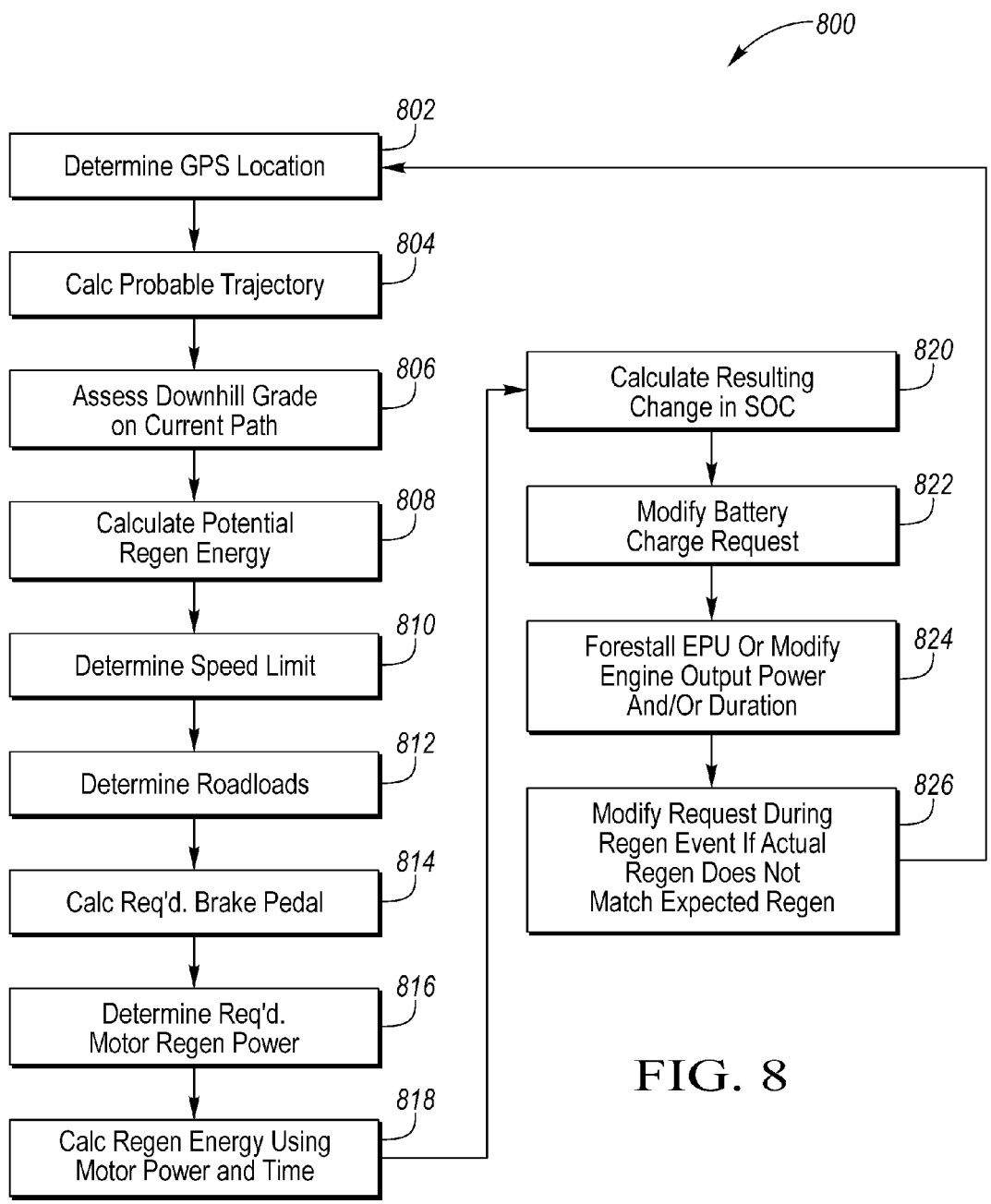
FIG. 8 is an exemplary flow diagram illustrating a grade-based target SOC computation for vehicle operation.

Similar to the speed-based method described in FIGS. 6-7, FIG. 8 is an exemplary flow diagram 800 illustrating a method of modifying battery management at high SOC, in relation to a road grade, in order to ensure enough battery capacity to maximize energy capture during an imminent regenerative braking event. The diagram shows a grade-based target SOC computation for vehicle operation. In block 802 a location is determined using a computing system including a global positioning system. Along with the location, a route may be generated by the computing system or navigation system. The computing system may include elevation data such as topographical data for the route. But, due to changes in roadways and a possibility that the maps and topographical data may not be always accurate, the computer system may also utilize other sources including GPS data or data from sensors in other vehicle systems including a wheel speed sensor, a steering angle sensor and an atmospheric pressure sensor (MAP sensor) to determine elevation data. Also, data may include future data such as estimated duration of vehicle operation based on electricity only and road grade. Here the road grade may be based on the angle of inclination further determined by multiple means including an output of an inclinometer or a combination of a wheel speed sensor output indicative of vehicle acceleration along a longitudinal plane of the vehicle and a vehicle longitudinal accelerometer output indicative of an acceleration along the longitudinal plane as affected by gravity. In block 804, a probable trajectory is calculated. In block 806, assessment of the road grade along the current path is performed. This assessment may use topological data associated with the route or, alternatively, an output of a longitudinal accelerometer compared to a change in velocity based on an output from a wheel speed sensor may be used.

A potential or available regenerative energy is calculated in block 808. The vehicle speed and road load is determined in blocks 810 and 812. The required braking force and motor regenerative energy is determined in blocks 814 and 816. Based on factors including vehicle speed, road load, required braking force and motor regenerative energy, available regenerative energy is calculated in block 818. Based on the available regenerative energy, a corresponding change in SOC is calculated in block 820. The target battery SOC operating range or setpoint is adjusted in block 822. In block 824, the controller discharges the battery by either keeping the engine shut-down longer while in EV-mode in order to use more battery energy for EV operation, or by reducing the engine output power and/or duration if the engine is running in order to use more battery energy for combined (hybrid) operation. In block 826, the actual regenerative energy is compared to the expected regenerative energy, and the request is modified if appropriate. For example, if the engine is running but the controller has reduced its output based on anticipated regenerative energy, the engine output can be increased if the regenerative energy collected is less than expected, or decreased further if the regenerative energy collected is more than expected. Similarly, if the vehicle is in EV-mode because the controller was trying to deplete the battery faster to accommodate the expected regenerative energy collection, but the regenerative energy is less than expected, then the controller may choose to start the engine to augment battery charging or supplement electrical loads.

Figure 9A:
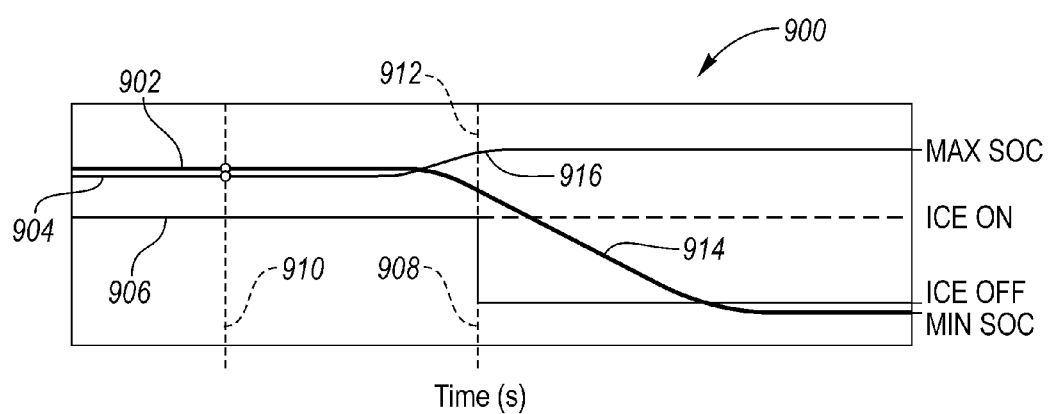
FIG. 9A is an exemplary graph that illustrates battery state of charge and internal combustion engine operation in relation to time and further in relation to vehicle speed or road grade.

FIG. 9A is an exemplary graph 900 that illustrates vehicle elevation 902, a battery state of charge 904, and internal combustion engine operation 906 in relation to time. At a point in time 910, the internal combustion engine (ICE) is operating to provide power to propel the vehicle on a flat road at a velocity and maintain the traction battery at a battery state of charge (SOC). When the vehicle traverses a downhill slope, energy from the powertrain is converted to electricity and flows to the traction battery increasing the battery SOC. At a point in time 912, the battery SOC crosses a stop engine threshold that triggers the engine to shut-off. The battery SOC may continue to increase because of current from the powertrain attributed to regenerative braking. However once the battery SOC reaches a maximum operational SOC, additional energy available from braking while traversing the downhill grade 914 will not be stored in the battery. In this exemplary graph, element 902 is illustrating vehicle elevation, but element 902 may be used to illustrate vehicle speed, or a combination of vehicle speed and elevation. An alternative way to view element 902 is a change in energy state of the vehicle, such as changes in vehicle kinetic energy or vehicle potential.

Figure 9B:
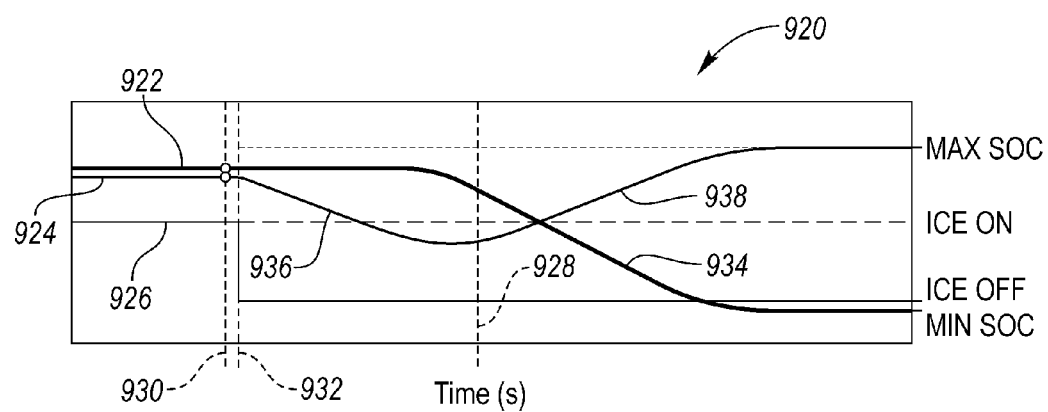
FIG. 9B is an exemplary graph that illustrates battery state of charge and internal combustion engine operation in relation to time and further in relation to vehicle speed or road grade, such that the internal combustion engine operation is maximized to capture available regenerative energy.

FIG. 9B is an exemplary graph 920 that illustrates vehicle elevation 922, a battery state of charge 924, and internal combustion engine operation 926 in relation to time. At a point in time 930, the internal combustion engine (ICE) is operating to provide power to propel the vehicle on a flat road at a velocity and maintain the traction battery at a battery state of charge (SOC). As an alternative to FIG. 9A, a vehicle or battery management system may reduce the target battery SOC such that potential regenerative energy may be captured. Here, the potential regenerative energy is expressed in equation 3 with current kinetic energy and current potential energy. The current kinetic energy is based on vehicle speed and vehicle mass, and the current potential energy is based on the road grade being associated with the angle of inclination. The potential regenerative energy is also based on the powertrain losses as determined by historical data. The result would be that a target SOC, or in an alternative an engine shut-off threshold SOC, may be reduced by the potential regenerative energy. Further, historical drive cycle data including historical driver braking, historical deceleration rates, historical auxiliary load usage, battery life, or the efficiency of converting kinetic and potential energy to electric energy may be used to adjust the potential regenerative energy. In this exemplary graph, element 922 is illustrating vehicle elevation, but element 922 may be used to illustrate vehicle speed, or a combination of vehicle speed and elevation. An alternative way to view element 922 is a change in energy state of the vehicle, such as changes in vehicle kinetic energy or vehicle potential.

If future information is known, such as a future route based on topographical information, future changes in elevation, future auxiliary load usage, or a future recharge event, the potential regenerative energy calculation may include this information. The knowledge of a future speed and a future road grade along a future route allows a predicted kinetic energy and predicted potential energy to be determined. For example, an engine normally shut off at point 928 may be shut off at point 932 based on knowledge of a future downhill slope 934. This may be due to a reduction in the engine stop threshold. Once the engine is turned off at 932, the vehicle is then operated by electricity only and the battery SOC decreases due to the current flowing from the battery to the vehicle. The decrease in SOC is shown by element 936. When the vehicle traverses the downhill slope 934, the energy from regenerative braking allows the vehicle to flow a current to the battery thus increasing the battery SOC 938. Also, based on historical driver braking or historical deceleration rates, the efficiency of converting kinetic and potential energy to electric energy may be used to adjust the potential regenerative energy. It may be beneficial to adjust the vehicle speed in relation to the slope. For example on a steep incline, it may be beneficial to reduce the vehicle speed. However in a vehicle with a cruise control module or an adaptive cruise control module, or based on customer feedback, operation at a constant velocity may provide a better driving experience for the operator and passengers. As such, the vehicle may be required to adjust for constant velocity operation or in the case of an adaptive cruise control module, a separation distance with the tracking vehicle may be adjusted in anticipation of changes in a speed of the tracking vehicle.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to, cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle comprising:
   an engine;
   a fraction battery; and
   a controller programed to, in response to a predicted duration of charge sustaining operation for a drive cycle being greater than a predetermined duration and a speed of the vehicle being less than a speed threshold, increase a state of charge threshold of the traction battery associated with triggering shut offs of the engine to reduce cycling of the engine during the drive cycle.

2. The vehicle of claim 1 wherein the state of charge threshold is greater than a sum of a predicted change in battery state of charge and a minimum state of charge.

3. The vehicle of claim 1, wherein the controller is further programmed to, while operating the engine to charge the traction battery, increase a fuel consumption of the engine to increase a current provided to the traction battery.

4. The vehicle of claim 1, wherein the state of charge threshold is based on a maximum capacity of the traction battery and an ambient temperature.

5. The vehicle of claim 1, wherein the controller is further programmed to increase the state of charge threshold by an amount based on losses associated with the engine.

6. The vehicle of claim 5, wherein the losses are based on a duration of the drive cycle.

7. A method of operating a hybrid electric vehicle comprising:
   in response to a predicted duration of charge sustaining operation for a drive cycle being greater than a predetermined duration and a speed of the vehicle being less than a speed threshold, increasing by a controller a state of charge threshold of a traction battery associated with triggering shut offs of an engine to reduce cycling of the engine during the drive cycle.

8. The method of claim 7, wherein the state of charge threshold is greater than a sum of a predicted change in battery state of charge and a minimum state of charge.

9. The method of claim 7 further comprising, while operating the engine to charge the traction battery, increasing a fuel consumption of the engine to increase a current provided to the traction battery.

10. The method of claim 7, wherein the state of charge threshold is based on a maximum capacity of the traction battery and an ambient temperature.

11. The method of claim 7 further comprising increasing the state of charge threshold based on losses associated with the engine.

12. The method of claim 11, wherein the losses are based on a duration of the drive cycle.

13. A vehicle traction battery control system comprising:
   a controller programed to, in response to a vehicle speed being less than a threshold speed and an expected duration of charge sustaining operation being greater than a predetermined duration, increase a traction battery state of charge threshold that, when exceeded while an engine is on, triggers a command to shut down the engine to reduce cycling of the engine.

14. The system of claim 13, wherein the expected duration is based on historical data including auxiliary electric load profiles, electric only operational profiles, vehicle speed profiles, vehicle power demand profiles, or battery power profiles.

15. The system of claim 13, wherein the controller is further programmed to, while operating the engine to charge a traction battery, increase a fuel consumption of the engine to increase a current provided to the traction battery.

16. The system of claim 13, wherein the traction battery state of charge threshold is based on ambient temperature.

* * * * *